UNITED STATES PATENT OFFICE.

HENRI RAYMOND VIDAL, OF PARIS, FRANCE.

TRIPHENYLMETHANE DYE AND PROCESS OF MAKING SAME.

SPECIFICATION forming part of Letters Patent No. 664,450, dated December 25, 1900.

Application filed December 1, 1898. Serial No. 697,993. (No specimens.)

*To all whom it may concern:*

Be it known that I, HENRI RAYMOND VIDAL, a resident of Paris, in the Republic of France, have invented a new and useful Improvement in the Manufacture of Coloring-Matters, which is fully set forth in the following specification.

In Patent No. 621,393, dated March 21, 1899, I have described and claimed a process of preparation of new coloring-matters from triphenylmethane consisting in condensing in a concentrated sulfuric medium the tetra-alkyl-hydrols with different aromatic hydrazins without it being necessary to employ an oxidizing agent to develop the coloring-matter. This process applied to other hydrazins mixed with the before-mentioned hydrols has resulted in a new series of coloring-matters of the same family. The present invention therefore relates and is confined specifically to a group of hydrazins distinct from the aromatic hydrazins mentioned in my patent aforesaid, the principal members of said group being tolyl and phenyl hydrazins.

In order that the invention may be clearly understood, I will describe certain specific applications thereof.

Examples.

I. I dissolve cold in ten parts of concentrated sulfuric acid tetramethylamidobenzhydrol, two hundred and seventy kilograms, and O-tolylhydrazin, one hundred and twenty-five kilograms. Heat to 60° until the disappearance of the hydrol. Raise the temperature 20°. The sulfuric solution, which was yellow, has after the lapse of one hour changed into a brown color, and the coloring-matter thus has been formed. It is isolated by neutralizing the dilute solution and then washed and dried. The product is a green-reddish brown insoluble in alkalies, slightly soluble in water, soluble in acids and alcohol, and dyes animal fiber in an acidulated bath into a violet tint.

II. If in the Example I for the O-tolylhydrazin an equivalent amount of O-tolylsulfohydrazin 1.2.5 is substituted

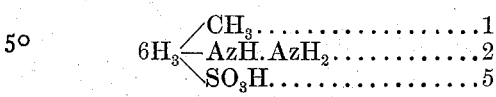

we obtain a coloring-matter of similar properties, dyeing animal fiber violet, inclining slightly more toward blue.

III. An equivalent amount of O-tolylsulfohydrazin 1.2.4 produces a coloring-matter insoluble in water, soluble and changing into yellow in the presence of dilute acids, into blue-green in the presence of alcohol and acetic acid, into blue in the presence of dilute caustic alkalies, and dyeing animal fiber into blue-violet.

IV. An equivalent quantity of paratolylhydrazin produces a coloring-matter insoluble in water and alkalies, soluble into green in the presence of alcohol, into yellow in the presence of acids, and dyeing animal fiber green in the presence of alcohol and acid.

V. If for paratolylhydrazin an equivalent amount of paratolylsulfohydrazin 1.4.3 is substituted

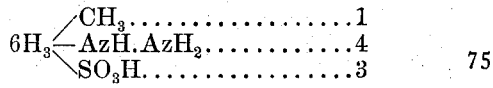

we obtain a coloring-matter insoluble in water and alkalies, slightly soluble into yellow in alcohol, soluble and changing into green in acetic acid, into yellow in mineral acids, and dyeing animal fiber into light yellow with green reflex.

VI. The use of an equivalent quantity of sulfonic paratolylhydrazin 1.4.2 produces an analogous coloring-matter of a similar solubility and of a yellow tint almost equal to the preceding.

VII. Yellow coloring-matters insoluble in water and alkalies, soluble in dilute alcohol and acids, are also obtained by condensing parachlorphenylhydrazin or parabromphenylhydrazin with tetramethyldiamidobenzhydrol in molecular quantities. These coloring-matters dye animal fibers into a yellow of a more green tint than those of sulfureted paratoluidins 1.4.3 and 1.4.2.

In all these examples the tetramethyldiamidobenzhydrol may be replaced by its tetraethylated isomer without the obtained coloring-matters being perceptibly different from those which I have just described as regards their solubility in chemical agents, as well as their tints upon animal fiber. On the contrary, the use of non-alkylated diamidobenzhydrol permits of obtaining coloring-matters of very different tints, which I will here describe, as the process is generically the same, but which will be specifically claimed in another divisional application.

Examples.

I. The process of condensation is absolutely similar to that which I have already described. Two hundred and fourteen kilograms of diamidobenzhydrol and one hundred and eight kilograms of phenylhydrazin condensed with ten parts of sulfuric acid produce a coloring-matter insoluble in water and alkalies, soluble into red in acetic acid, into yellow in mineral acids, into red in alcohol, and dyeing animal fiber into violaceous red.

II. An equivalent quantity or orthotolylhydrazin produces a red coloring-matter insoluble in water and alkalies, soluble producing a red color in alcohol and acetic acid, a dark-greenish yellow in dilute mineral acids, and dyeing wool in a more yellow and brighter red than the preceding.

III. An equivalent quantity of alphabenzylhydrazin or of methyl or ethyl phenylhydrazin produces a coloring-matter insoluble in alkalies, soluble with difficulty in water, soluble in alcohol and dilute acids, and dyeing the fiber fuchsin-red.

IV. An equivalent quantity of O-tolylsulfohydrazin 1.2.5 produces a coloring-matter slightly soluble in water, soluble with difficulty in alkalies, soluble in acids, fairly soluble in alcohol, and dyeing animal fiber into red-blue of greater beauty.

V. The corresponding coloring-matter derived from O-tolylsulfohydrazin 1.2.4 is analogous as regards solubilities, but dyes animal fiber into a less handsome and more blue tint than the preceding.

VI. Hydrazin derived from parasulfanilic produces a violaceous-red coloring-matter slightly soluble in water and alkalies and soluble in acids.

While a tolyl hydrazin only is referred to in the claims, it is of course to be understood that the scope of the claims embraces also chlor and brom phenyl hydrazins, which are equivalents of the tolyl hydrazins for the purposes set forth.

Having now described my said invention, I claim—

1. The process of producing the coloring-matters herein described by condensation of a tetralkyl hydrol with a tolyl hydrazin in a sulfuric-acid medium, as set forth.

2. The products of the described process, namely, coloring-matters derived by condensation in sulfuric acid of a tetralkyl hydrol with a tolyl hydrazin as set forth, said coloring-matters being insoluble or little soluble in water and alkalies, and soluble in acids and alcohol.

In testimony whereof I have signed this specification in the presence of two subscribing witnesses.

HENRI RAYMOND VIDAL.

Witnesses:
EDWARD P. MACLEAN,
JULES ALPHONSE GUSTAVE TOUSSEL.